United States Patent [19]

Jones

[11] 3,881,976

[45] May 6, 1975

[54] FIBER BUNDLES FOR ORNAMENTAL DISPLAY DEVICES AND METHOD OF MAKING SAME

[75] Inventor: James A. Jones, Sturbridge, Mass.

[73] Assignee: American Optical Corporation, Southbridge, Mass.

[22] Filed: Feb. 16, 1973

[21] Appl. No.: 333,439

[52] U.S. Cl. ............ 156/180; 65/DIG. 7; 156/167; 156/174; 156/250; 156/256; 156/296; 161/12; 240/10 L
[51] Int. Cl. ..................... B32b 17/04; G02b 5/16
[58] Field of Search........ 350/96 B; 240/10 L, 10 T; 156/167, 174, 180, 221, 250, 256, 296, 86; 65/DIG. 7; 161/12

[56] References Cited
UNITED STATES PATENTS

| | | | |
|---|---|---|---|
| 1,640,599 | 8/1927 | Conn | 156/180 |
| 3,083,131 | 3/1963 | Wentz | 156/174 |
| 3,104,191 | 9/1963 | Hicks, Jr. et al | 156/180 |
| 3,586,562 | 6/1971 | Jones | 156/174 |
| 3,641,335 | 2/1972 | Wall | 240/10 P |
| 3,758,285 | 9/1973 | Knowlton | 65/64 |

*Primary Examiner*—Daniel J. Fritsch
*Attorney, Agent, or Firm*—H. R. Berkenstock, Jr.; William C. Nealon

[57] ABSTRACT

A bundle of optical fibers for use in the manufacture of an ornamental bouquet, lamp or like device. A ribbon or juxtaposed fibers is formed with its fibers secured together along a strip extending across the width of the ribbon intermediately of its opposite ends. The ribbon is rolled laterally to bundle the fibers together and ends of the fibers at one side of the securing strip are grouped tightly together while portions of the fibers oppositely of the strip remain unconnected to flare freely outwardly of the bundle when the bundle is disposed vertically.

8 Claims, 14 Drawing Figures

FIBER BUNDLES FOR ORNAMENTAL DISPLAY DEVICES AND METHOD OF MAKING SAME

BACKGROUND OF THE INVENTION

1. Field of the Invention:

Optical fiber bundles with particular reference to ornamental display devices formed thereof.

2. Description of the Prior Art

Optical fiber bouquets, lamps and similar ornamental display devices are currently formed by various time consuming and difficult methods, one being to group loose fibers tightly together, glue or otherwise secure one end of the group and stand the resulting device upright for trimming. Loose portions of the fibers are trimmed with scissors by cutting the innermost fibers shorter than the outer fibers causing these inner fibers to stand in a more vertical direction than outer fibers which are allowed to flare away from the bundle as a result of their greater length. Such hand-trimming of a bundle of fibers is not only a difficult and tedious task but requires considerable skill, not unlike the art of human hair cutting, to perform with reasonable success in accomplishing proper grading of the flare of fibers and uniformity of overall fiber bundle shape.

Other methods of forming optical fiber display devices have involved the making of assemblies of concentric tubes and/or rings of different lengths with fibers extending longitudinally through spaces between the tubes and outwardly away therefrom in layers along the assembly of tubes or rings. In addition to the inherent difficult and time-consuming problems of arranging and maintaining individual fibers parallel in spaces between the concentricly related tubes and rings and affording spaces therebetween which are adequate for the purposes of containing the fibers without excessive looseness and misplacement therein, this technique is limited to the making of only the one resulting general shape of fiber display.

A principle objective of the present invention is to overcome the difficulties in manufacture, costliness, and limitations in design of the prior art fiber optical ornamental display devices by reducing the number of fibers in a display needed for a particular aesthetic effect and bringing all fibers of the display accurately to proper length with a single cutting operation which may be readily varied according to the ultimate circumferential and vertical shape and overall aesthetic effect desired of the completed device.

SUMMARY OF THE INVENTION

The foregoing and corollary objectives of the invention are accomplished by forming a ribbon of a multiplicity of juxtaposed fibers, securing these fibers together along a strip of substantial width across the ribbon, cutting the fibers approximately parallel to the strip at one side thereof, trimming corresponding opposite portions of the fibers to predetermined lengths preferably with a single line of cut directed according to a desired pattern of flare to be produced in the ultimate display device and rolling the resulting cut section laterally into a bundle. When oriented vertically, the fibers will flare outwardly and automatically assume the predetermined overall configuration desired of the display device. By directing light into the first mentioned fiber ends, illumination of the display device may be effected.

Details of the invention will become more readily apparent in the following description when taken in conjunction with the accompanying drawings.

IN THE DRAWINGS

FIGS. 7, 9, 11 and 13 are plan views respectively of modified forms of sections of optical fiber ribbons useful in the practice of the invention; and FIGS. 8, 10, 12 and 14 are illustrations of further embodiments of the invention resulting from use of the sections of optical fiber ribbons of FIGS. 7, 9, 11 and 13 respectively.

DESCRIPTION OF THE PREFERRED EMBODIMENTS

Figure 1:
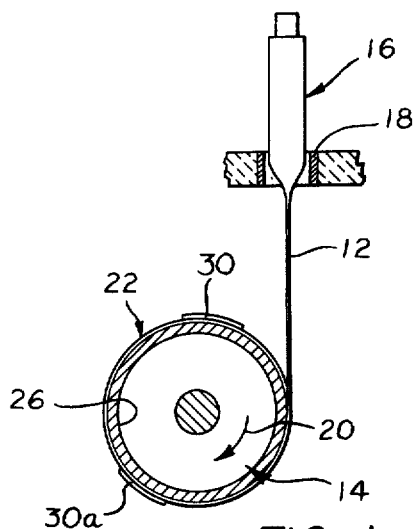
FIG. 1 is a diagrammatic illustration of a preferred technique for forming a ribbon of juxtaposed optical fibers.
Figure 2:
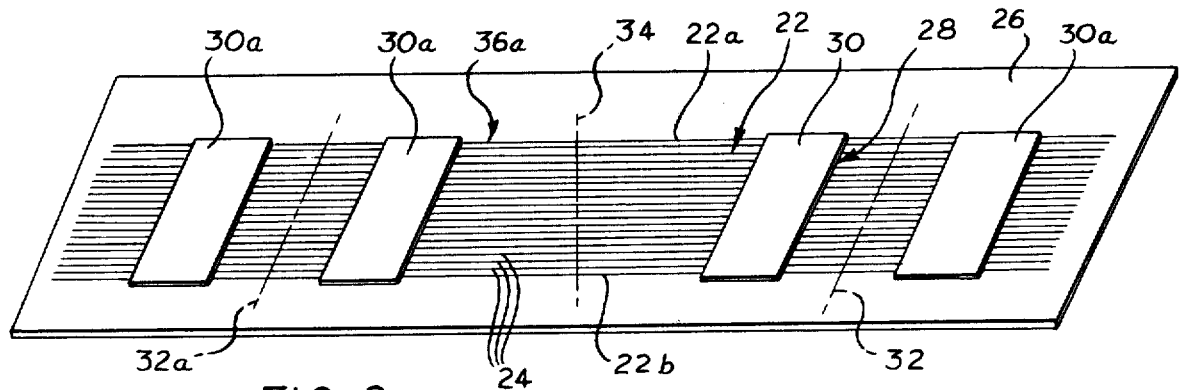
FIG. 2 is an illustration, in perspective, of a ribbon of optical fibers removed from the apparatus of FIG. 1 and extended in a flat plane.
Figure 3:
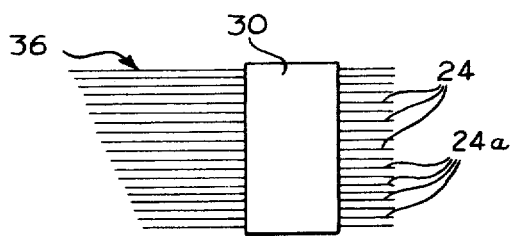
FIG. 3 is a plan view of a section of the ribbon of FIG. 2 from which one embodiment of the invention may be formed.
Figure 6:
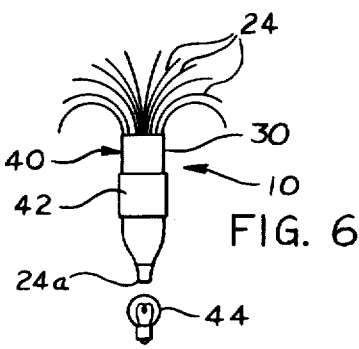
FIG. 6 illustrates the embodiment of the invention resulting from the method depicted in FIGS. 2–5.

Referring more particularly to FIGS. 1–5 which illustrate a method of making the fiber optical ornamental display device 10 of FIG. 6 according to principles of the invention, the fiber ribbon shown in FIG. 2 is preferably formed by winding a length of light-conducting fiber 12 of glass or plastic material into a helix upon winding drum 14. Fiber 12 may be supplied to drum 14 from a source of batch material such as a glass rod and tube assembly 16 which is heated by a suitable heater 18 and drawn to fiber size by rotation of drum 14 in the direction of arrow 20 as the optical fiber ribbon 22 is produced. Those interested in details of clad optical fiber per se and/or this technique for simultaneously drawing and winding an optical fiber into a helix as a ribbon 22 of juxtaposed lengths of fiber 24 (FIG. 2) may refer to one or more of U.S. Pat. Nos. 3,033,731; 3,104,191; 3,215,029; 3,247,755; and 3,373,006.

Filament 12 from which fibers 24 are formed may, alternatively, be supplied to drum 14 from a previously prepared supply thereof on a reel (not shown), the supply reel being substituted for assembly 16. The optical fiber may be either glass or plastic.

For purposes of rendering ribbon 22 readily removable from drum 14, drum 14 is preferably covered with a plastic sleeve 26 adapted to be cut away from or slid endwise off one end of drum 14, carrying ribbon 22 with it.

A transverse area 28 of ribbon 22 is coated with an adhesive and a strip 30 of thin plastic film material is secured to the area 28. This transverse area 28 and strip 30 is of a width controlled according to the height desired of the rigid portion of the fiber optic display device 10 to be formed from ribbon 22.

Figure 4:
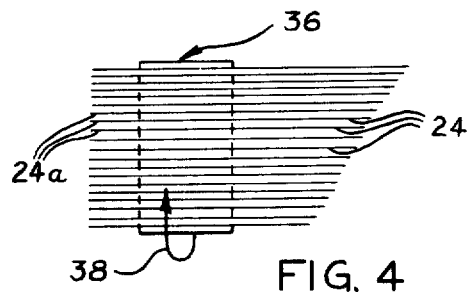
FIG. 4 is an illustration of the section of ribbon inverted.
Figure 5:
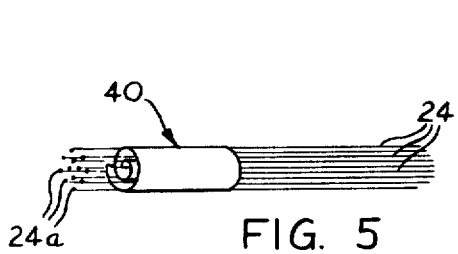
FIG. 5 is an illustration, in perspective, of a further step in the method of the invention wherein the section of ribbon illustrated in FIG. 4 is rolled laterally.

With strip 30 securely fastened to fibers 24, the plastic sheet of sleeve 26 is removed from under fibers 24 and fibers 24 are cut to uniform length along line 32 at one side of strip 30, and along a bias, e.g. line 34, making the portions of fibers extending from strip 30 longer at side 22a of ribbon 22 than at side 22b of the ribbon. The section 26 (FIG. 2) of ribbon 22 thus formed is preferably inverted as shown in FIG. 4 and rolled in the direction of arrow 38 to form bundle 40 of FIG. 5. This rolling of section 36 from its side having the shortest fibers 24 toward its side having the longest fibers, places the shorter fibers centrally within bundle 40 and the longer fibers circumferentially externally of bundle 40. The fibers are thus graduated from the center of the bundle outwardly to its edge.

When bundle 40 is directed vertically with ends 24a of fibers 24 depending, its fibers of graduated length will flare outwardly and automatically produce a uniformly proportioned ornamental display of the type diagrammatically illustrated in FIG. 6.

It should be understood that, for clarity of illustration, all display devices shown in the drawings (i.e. FIGS. 6, 8, 10, 12 and 14) are depicted diagrammatically. Far fewer than the normal number of fibers in each are shown.

In display devices such as are shown in any one of FIGS. 6, 8, 10, 12 and 14, a short fiber will stand generally straight up and a long fiber will arch in a complete semi-circle while fibers of intermediate lengths will arch in graduated amounts between the longest and shortest optical fibers. The extent of maximum and minimum flaring or arching of the fibers can be controlled by proper selection of the diametral size of fibers 24, i.e. their rigidity, and their lengths at sides 22a and 22b respectively of ribbon 22. Trial and error trimming of single test fibers, held vertically, may be undertaken to establish proper lengths for opposite sides 22a and 22b of fiber ribbon 22.

In adapting bundle 40 to use as an ornamental display device or lamp, the bundle is taped circumferentially or held together with a suitable tubular sheathing 42 which, in place of winding of tape, may be a heat shrinkable material slipped into place at room or relatively low temperature and heated sufficiently to shrink tightly and firmly upon bundle 40. Ends 24a of fibers 24 may then be gathered tightly together and cemented or otherwise so held in place as a light-receiving face of bundle 40 so that light from a suitable source such as lamp 44 may be received by these ends 24a and transmitted through individual fibers 24 to their flared opposite ends for enhancing the aesthetics of bundle 40.

Referring back to FIG. 2, it can be seen that by providing a succession of strips 30a similar to strip 30 along ribbon 22 at prearranged spaced intervals and adding additional transverse cuts such as cut 32a, a plurality of fiber sections (e.g. additional section 36a) may be formed of ribbon 22 along its length. The number of added sections 36a is dependent, of course, upon the total length of ribbon 22 and maximum total length of each individual section 36 and 36a. The diametral size of winding drum 14 will determine the ultimate total length of ribbon 22 while the diametral thickness of bundle 40 (FIGS. 5 and 6) and number of fibers 24 caused to flare outwardly therefrom is determined by the total width of ribbon 22 and spacing between individual fibers 24 thereof in the winding of ribbon 22 on drum 14. The diametral thickness may also be controlled by the tightness with which it is rolled. In the matter of control of the number of fibers in bundle 40, ribbon 22 may be wound with each convolution of supply fiber 12 placed in side-by-side contact with each other or spaced from each other wherein the former will provide a maximum number of fibers per unit width of ribbon and the latter can produce a minimum.

Referring more particularly to modifications of the invention shown in FIGS. 7–14, it will become apparent that various amounts and configurations of flare and/or changes in overall shape of the final display device can be accomplished by simply altering the shape and size of the transverse strips used to secure fibers 24 together and changing the direction and/or shape of cut used to produce the flared fiber ends.

Figure 7:
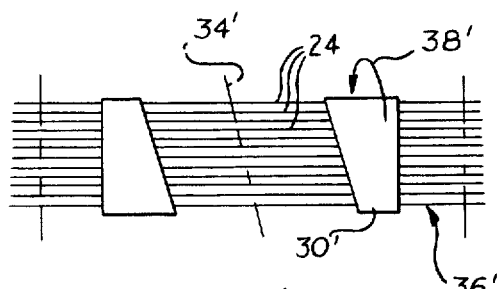
Figure 8:
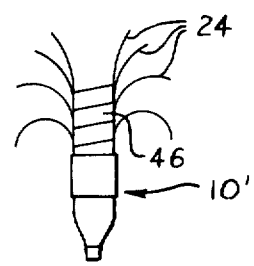

FIG. 7 illustrates a section 36' which may be cut from ribbon 22 and rolled in the direction of arrow 38' to form display device 10' having a generally upwardly spiraled core portion 46. This shape in FIG. 8 is achieved by the use of strip 30' which is generally tapered as illustrated. Cuts across fibers 24 along lines 32' and 34', which are similar to lines 32 and 34 of FIG. 2, are used so that the particular fibers 24 adjacent the widest edge of strip 30' are shorter than fibers 24 adjacent the narrowest opposite edge of strip 30'. Thus, by rolling strip 30' from its widest edge in the direction of arrow 38', the spiral core 46 of FIG. 8 is formed. This gives device 10' a longer or higher appearance than is given by device 10.

It is to be understood that in the making of any of the devices depicted in FIGS. 6, 8, 10, 12 and 14, the particular section of fiber ribbon used therefor may be rolled over a hollow or solid core. The core may be cylindrical, conical and/or a rectilinear cross-section. Also, in cases where cores are not used, the roll may be relatively tight at its beginning (i.e. at the center of the resulting bundle) or, alternatively, relatively loose so as to provide a hollow center in the bundle.

Figure 9:
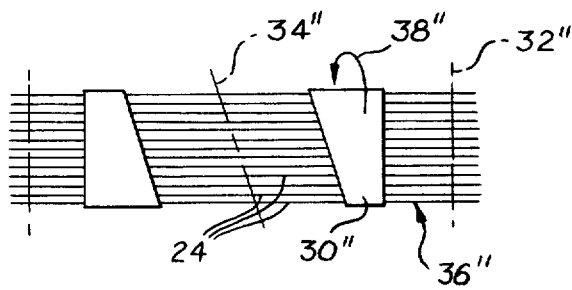
Figure 10:
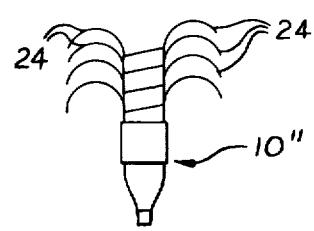
Figure 11:
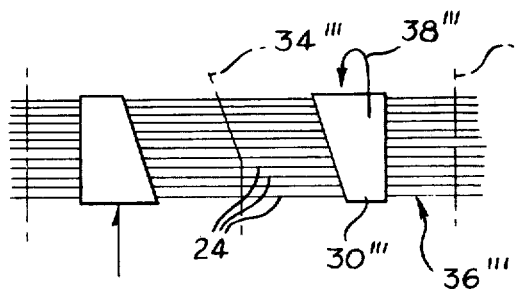

The modification of the invention shown in FIGS. 9 and 10 may be employed to produce a display device 10'' (FIG. 10) appearing similar to device 10' of FIG. 8 but with all fibers 24 thereof flared outwardly by equal amounts throughout the length of the fiber display thereby providing the device with a generally overall cylindrical appearance. This is accomplished by using strip 30'' and cuts 32'' and 34'' all of which are similar to those used in FIG. 7 with the exception of cut 34'' being directed parallel to the adjacent side of strip 32'' thus making all lengths of fiber 24 between strip 30'' and cut 34'' of equal length. Rolling the section 36'' of FIG. 9 in the direction of arrow 38'' will then produce device 10'' of FIG. 10.

Figure 12:
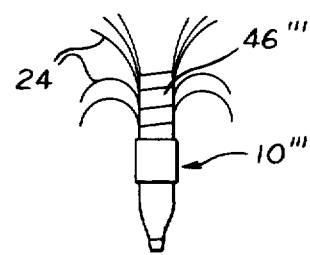
Figure 13:
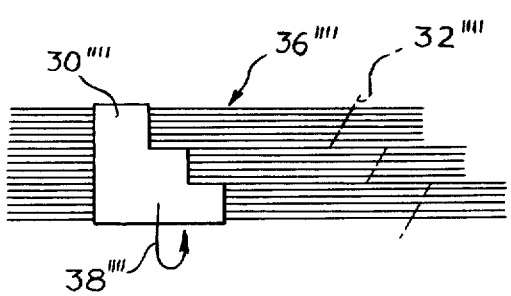

The device 10''' of FIG. 12, also having a spiral core section 46''', has its fibers flared outwardly from core 46''' in different directions and by different amounts at various levels in the device 10'''. This is accomplished with the arrangement of a strip 30''' and cut 32''' across section 36''' which are similar to those of FIGS. 7 and 9. The straight bias cut of FIGS. 7 and 9 is, however, altered by the jog shown in FIG. 11. With section 36''' rolled in the direction of arrow 38''', the device 10''' of FIG. 12 results. The configuration of device 10''' may also be modified by varying the extent of taper provided by strip 30''' and/or varying the angle and/or length of the jog in cut 34'''.

Figure 14:
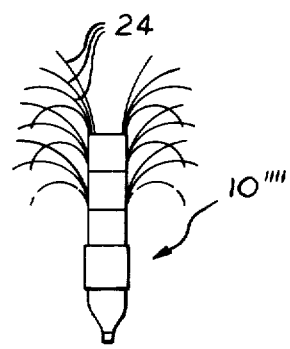

The flaring of fibers 24 of device 10''' outwardly in tiers as depicted in FIG. 14 may be accomplished with stepped strip 30'''' and a correspondingly stepped cut 32''''. Section 36'''' is rolled in the direction of arrow 38''''.

It is to be understood that in the case of any one or more of the embodiments of the invention shown in FIGS. 1–14, ends 24a of the fibers 24 may be grouped tightly together as illustrated or permitted to depend from the finished bundle in a loose or circular array for receiving different amounts and/or colors of light projected thereinto through perforated, slotted or otherwise apertured plates either fixed or rotated relative to the fibers. Furthermore, any one or more of the sections of ribbon 22 which are used to form one or another of the illustrated display bundles may be left unrolled or only partially rolled with the unrolled portion thereof allowed to assume a free form shape having ends 24a of its fibers gathered together as a light receiving end of the particular bundle shape elected.

I claim:

1. The method of making an ornamental bouquet of flared light-conducting fibers comprising the steps of:
    forming a ribbon of a plurality of juxtaposed light-conducting fibers;
    securing said fibers together with a strip of material extended across said ribbon;
    cutting across said ribbon through said juxtaposed fibers along two lines, one spaced away from each of respectively opposite sides of said strip, one of said lines being oblique to the longitudinal direction of said fibers at least throughout a substantial portion of its extension across said ribbon to produce fibers of progressively varying lengths according to the ornamentation desired of said bundle;
    removing the section of said ribbon extending between said two lines of cutting;
    rolling said section of ribbon from an edge adjacent the shortest of said varying lengths of fibers toward its opposite edge in a direction generally perpendicular to axial directions of the juxtaposed fibers to form at least some of said fibers into a bundle;
    securing said bundle against unrolling; and
    orienting said bundle generally vertically with said fibers extending from one side of said strip directed generally upwardly and ornamentally flared outwardly of said bundle.

2. The method according to claim 1 wherein said strip of material is an adhesive.

3. The method according to claim 2 wherein said strip of material further includes a plastic film attached to said adhesive.

4. The method according to claim 1 wherein said one of said lines along which said fibers are cut biases said fibers at an acute angle relative to at least one of said opposite sides of said strip.

5. The method according to claim 1 wherein one of said opposite sides of said strip is disposed and directed substantially parallel to the direction of said one oblique line of cutting.

6. The method according to claim 1 wherein said one of said lines of cutting across said ribbon biases said fibers in one direction partially thereacross and is jogged to a different direction over remaining fibers of said ribbon.

7. The method according to claim 1 wherein said one of said lines of cutting across said ribbon contains a plurality of jogs in its extent thereacross.

8. The method according to claim 1 wherein portions of said fibers extending from the side of said strip opposite to said one side are grouped and secured tightly together.

* * * * *